(12) United States Patent
Anglin et al.

(10) Patent No.: US 6,901,417 B2
(45) Date of Patent: May 31, 2005

(54) METHOD, SYSTEM, AND PROGRAM FOR UPDATING RECORDS IN A DATABASE WHEN APPLICATIONS HAVE DIFFERENT VERSION LEVELS

(75) Inventors: Matthew Joseph Anglin, Tucson, AZ (US); Barry Fruchtman, Tucson, AZ (US); Michael Allen Kaczmarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 10/044,125

(22) Filed: Jan. 11, 2002

(65) Prior Publication Data

US 2003/0135518 A1 Jul. 17, 2003

(51) Int. Cl.[7] .............................................. G06F 17/30
(52) U.S. Cl. ........................ 707/203; 707/10; 707/102
(58) Field of Search .................. 707/10–102, 200–203, 707/104, 1, 4–5; 709/203

(56) References Cited

U.S. PATENT DOCUMENTS

| | | |
|---|---|---|
| 5,428,782 A | 6/1995 | White |
| 5,555,405 A | 9/1996 | Griesmer et al. |
| 5,960,189 A * | 9/1999 | Stupek et al. ............... 717/169 |
| 6,055,550 A | 4/2000 | Wallack |
| 6,557,012 B1 * | 4/2003 | Arun et al. .................. 707/203 |
| 6,598,059 B1 * | 7/2003 | Vasudevan et al. ......... 707/203 |
| 6,631,386 B1 * | 10/2003 | Arun et al. .................. 707/203 |
| 6,636,861 B1 * | 10/2003 | Stack .......................... 707/101 |
| 6,721,742 B1 * | 4/2004 | Uceda-Sosa et al. .......... 707/10 |
| 2002/0174142 A1 * | 11/2002 | Demers et al. |

* cited by examiner

Primary Examiner—Greta Robinson
Assistant Examiner—Debbie M. Le
(74) Attorney, Agent, or Firm—David W. Victor; Konrad Raynes & Victor LLP

(57) ABSTRACT

Provided is a method, system, and program for updating data in a database table in response to requests from a requesting application comprising one of a first application at a first version level and a second application at a second version level. The first application recognizes the table as including a subset of columns in the table that is less than all the columns in the table and the second application recognizes the table as including all the columns in the table. A request is received from the requesting application for specified columns from one record in the table and the requested record is accessed. A data structure is generated including data from the specified columns in the requested record. A determination is made as to whether the requesting application is capable of recognizing all the columns in the table. If so, data from each column in the table that is not one of the subset of columns is added to the data structure. The data structure is returned to the requesting application.

31 Claims, 4 Drawing Sheets

Initial Version

Table V.1

Updated Version

Table V.2

Mixed Versions

Table V.2

Record Data Structure

METHOD, SYSTEM, AND PROGRAM FOR UPDATING RECORDS IN A DATABASE WHEN APPLICATIONS HAVE DIFFERENT VERSION LEVELS

BACKGROUND OF THE INVENTION

1. Field of the Invention

The present invention relates to a system, method, and program for updating records in a database when applications have different version levels.

2. Description of the Related Art

In a database system, an application program may attempt to access and manipulate rows of data in a database table. If the database table is upgraded to include additional columns of data, then an upgraded version of the application may write meaningful data to the additional columns. If the application is down level to a current version level such that the down level version recognizes less than all of the columns in the data base table, then certain of the down level application operations could corrupt or erase meaningful data in the additional columns not recognized by the downgraded application. The term "down level" refers to a version of an application that was released before an "upgraded" version. Such down level applications typically include less functionality than the upgraded version.

For instance, a down level application may erase or corrupt meaningful data when updating a key column in an index record in an index on a database table, where the index provides a sorting of the table records according to the value(s) in the key column(s). The index key columns are comprised of selected columns of the table, and may include any of the values that are possible for that particular column. Columns that are used frequently to access a table may be used as key columns. The index may order the records according to their index column values in a B-tree data structure, or balanced tree. Moreover, the down level application may erase or corrupt meaningful data when updating a non-key column in the database.

When updating one index key column for the database table, the down level application must delete the affected row from the table so that the down level application may enter the modified data into the column at-issue. Upon updating the index key column, the down level application would provide the record to an index manager within the database engine to reinsert the updated record in the index according to the index ordering method, e.g., a B-tree index. In the prior art, the down level application would delete and update a record by first fetching the record, deleting the record, updating the columns and then reinserting the record. However, if the down level application does not provide data for all the columns, then the database engine would use default values for extended columns not recognized by the down level application in the inserted record, thereby erasing any meaningful data that was previously maintained in the extended columns by the upgraded version but unknown to the down level application.

For these reasons, there is a need in the art for improved techniques for allowing applications to update rows in a database table.

SUMMARY OF THE PREFERRED EMBODIMENTS

Provided is a method, system, and program for updating data in a database table in response to requests from a requesting application comprising one of a first application at a first version level and a second application at a second version level. The first application recognizes the table as including a subset of columns in the table that is less than all the columns in the table and the second application recognizes the table as including all the columns in the table. A request is received from the requesting application for specified columns from one record in the table and the requested record is accessed. A data structure is generated including data from the specified columns in the requested record. A determination is made as to whether the requesting application is capable of recognizing all the columns in the table. If so, data from each column in the table that is not one of the subset of columns is added to the data structure. The data structure is returned to the requesting application.

In further implementations, a request is received from the requesting application to delete the accessed record after returning the data structure to the requesting application. In response, the accessed record from the table is deleted.

Still further, the data structure returned to the requesting application including data updated by the requesting application is received and a table record is generated having columns including the data in the received data structure, including the data updated by the requesting application. The generated table record is inserted into the table.

In still further implementations, after deleting the table record, an index record in an index on the table corresponding to the deleted table record is deleted. One index record is added to the index for the inserted table record, wherein the data updated by the requesting application comprises at least one index key column used to sort the index records in the index.

Further provided is a method, system, and program updating data in a database table by a first application at a first version level. The first application recognizes the table as including a subset of columns in the table that is less than all the columns in the table. A second application at a second version level recognizes the table as including all the columns in the table. The first application transmits a request for specified columns from one record in the table to an application server managing access to the database table. In response to the request, the first application receives from the application server a data structure including data from the specified columns in the requested record and data from each column in the table that is not one of the subset of columns recognized by the first application.

The described implementations provide techniques for an application client program to interact with an application server when the application operates at a version level that is lower than the version level of the application server and database managed by the application server. In such cases, the database may include data columns that the down level application does not recognize. Described implementations provide mechanisms to allow the down level application to interact with the database in a manner that does not inadvertently affect data in the columns the down level application does not recognize.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
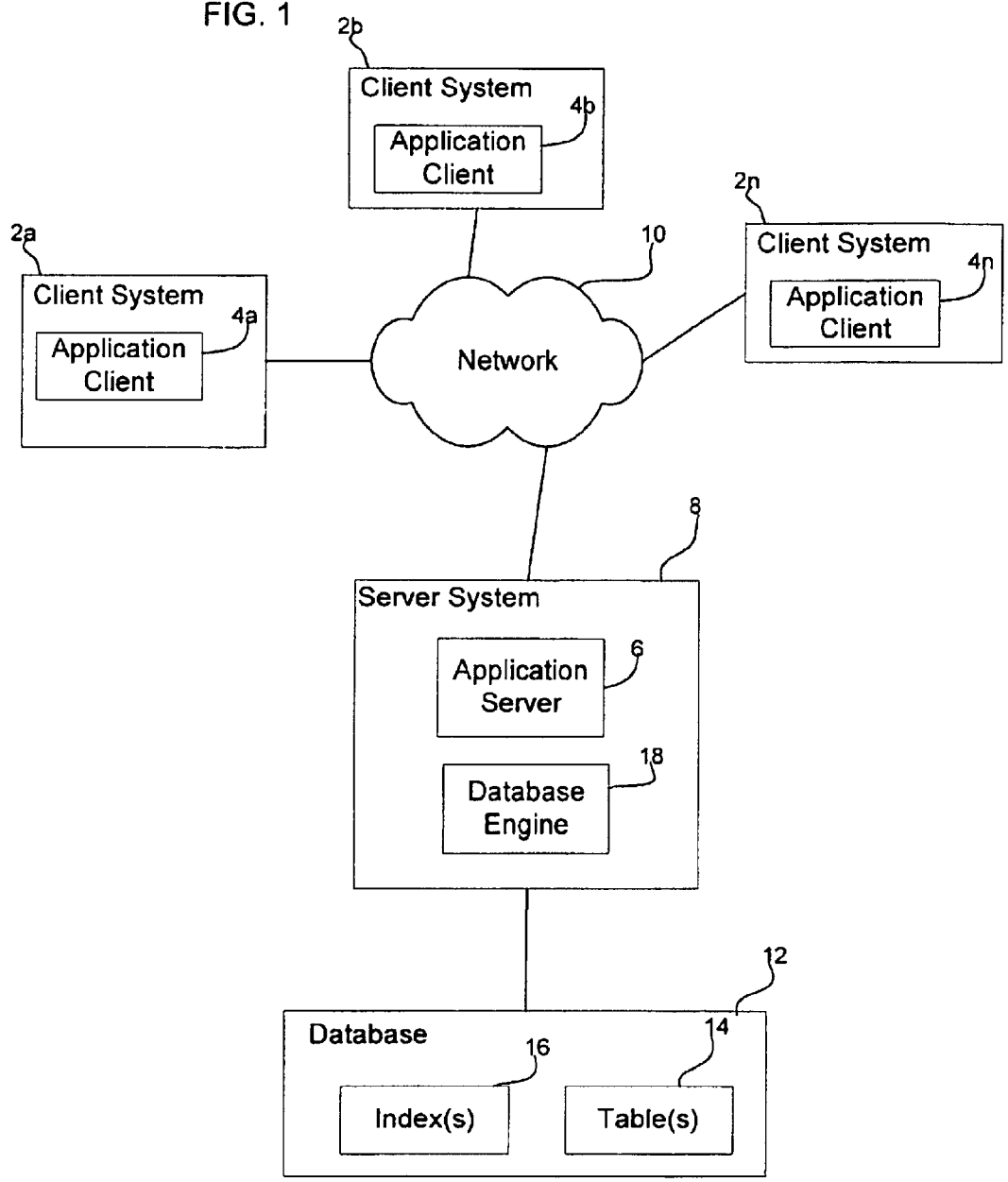
FIG. 1 illustrates a computing environment in which aspects of the invention are implemented.

FIG. 1 illustrates a computing environment in which aspects of the invention are implemented. A plurality of client systems 2a, 2b . . . 2n each include an application client program 4a, 4b . . . 4n that interacts with an application server program 6 in a server system 8 over a network 10 to perform operations in a client/server application environment. In certain implementations, the application clients 4a, 4b . . . 4n include Application Programming Interfaces (APIs) and other code to enable the application clients 4a, 4b . . . 4n to initiate application operations with the application server 6 and request data from the application server 6 that is maintained within a database 12 including tables 14 and indexes 16. The application server 6 uses the database 12 to store application information and state data concerning the status of the client/server application.

In response to receiving data requests from the application clients 4a, 4b . . . 4n, the application server 6 would perform any requested operations. If the APIs from the application client 4a, 4b . . . 4n request data from the database 12, then the application server 6 would generate database commands understood by a database engine 18. The database engine 18 accesses, stores, and modifies data in the database tables 14 and indexes 16 in a manner known in the art. The database requests from the application server 6 may comprise application specific APIs to access data in the tables 14 and indexes 16 or database APIs, such as the Open Database Connectivity (ODBC) interface, the DB2 Call Level Interface, etc. The database commands the application server 6 generates to implement the client application 4a, 4b . . . 4n requests may comprise Structured Query Language (SQL) commands, or other database commands that are processed by the database engine 18 to execute against the database 12.

The client systems 2a, 2b . . . 2n may comprise any computing device known in the art, including workstations, personal computers, personal digital assistant (PDA), server class machine, mainframe, telephony device, etc. The server system 8 comprises a server class machine capable of handling requests from multiple clients. The database engine 18 and database 12 may be implemented using database systems known in the art, such as DB2, MICROSOFT Access, Oracle Corporation's ORACLE 8,** etc. The network may comprise any network system known in the art, including a Local Area Network (LAN), Storage Area Network (SAN), Wide Area Network (WAN), Internet, an Intranet, etc.

**Microsoft is a registered trademarks of Microsoft Corporation; DB2 and Tivoli are registered trademarks of IBM; and Oracle8 is a trademark of Oracle Corporation.

Figure 2A:
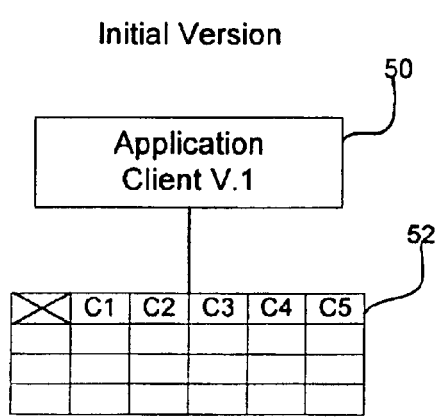
FIGS. 2a, 2b, and 2c illustrates how application client versions interact with database versions in accordance with implementations of the invention.
Figure 2B:
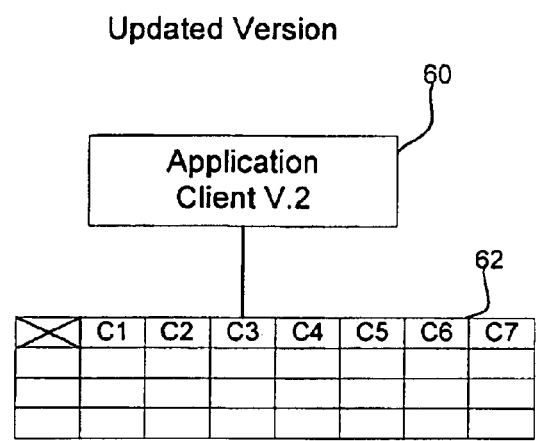
Figure 2C:
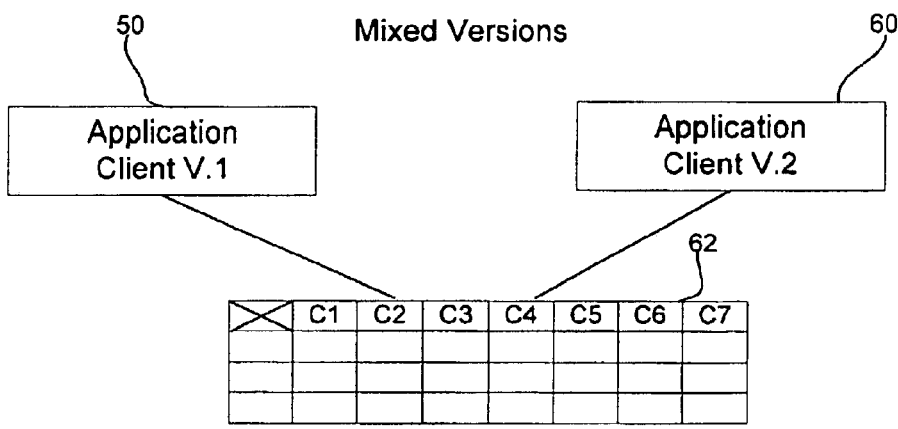

FIGS. 2a, 2b, and 2c illustrate how different versions of the application client interact with different versions of the database table. With respect to FIG. 2a, an initial version V.1 of the application client 50 is aware of a database table 52 having five columns (C1–C5), and performs operations with respect to the data in the five columns (C1–C5). Table 52 is a different version of the same table as table 62 where table 62 has extended columns, but is otherwise the same as table 52. With respect to FIG. 2b, a subsequent version V.2 of the application client 60 is aware of a database table 62 having seven columns (C1–C7), including two additional columns (C6, C7). In the event that the application client V.2 60 is downgraded to the initial version (V.1) of the application 50 or certain of the installed initial versions of the application client 50 have not been upgraded to the subsequent version V.2, with respect to FIG. 2c, then the data table would be at the subsequent version level (V.2) 62. In such case, the application client (V.1) 50 would only be aware of the five initial version table columns (C1–C5) and not the additional two table columns (C6, C7) added by the installation of the subsequent version (V.2). In such mixed version environments shown in FIG. 2c, the application client (V.1) 50 is capable of requesting data from a subsequent version table (V.2), but would only know of and access data in the first five columns (C1–C5) that are common with the initial version table (V.1) 52.

In a mixed version environment, the initial version application client 50 may attempt to update or modify data in a column of the table 62 that is a key column in the corresponding index for the table on which the index records are ordered. In such case, the update request from the application client 4a, 4b . . . 4n to the application server 6 would require deleting the record having index key columns to update, updating the record, and then reinserting the record into the table 14, which would cause an index record for the reinserted table 14 record to be added to the index 16 for the table 14.

Figure 3:
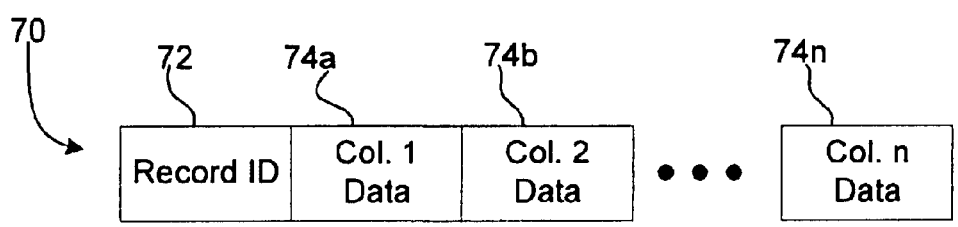
FIG. 3 illustrates a record data structure in accordance with implementations of the invention.

FIG. 3 illustrates an example of a record data structure 70 the application server 6 communicates back to the application client 4b to provide information on a requested record in the table 14. Upon accessing a requested record in response to a query, the application server 6 would generate the record data structure 70 to include a unique record identifier (ID) 72 of the accessed record in the table 14 and data from the columns in the accessed record into corresponding column fields 74a, 74b . . . 74n.

Figure 4:
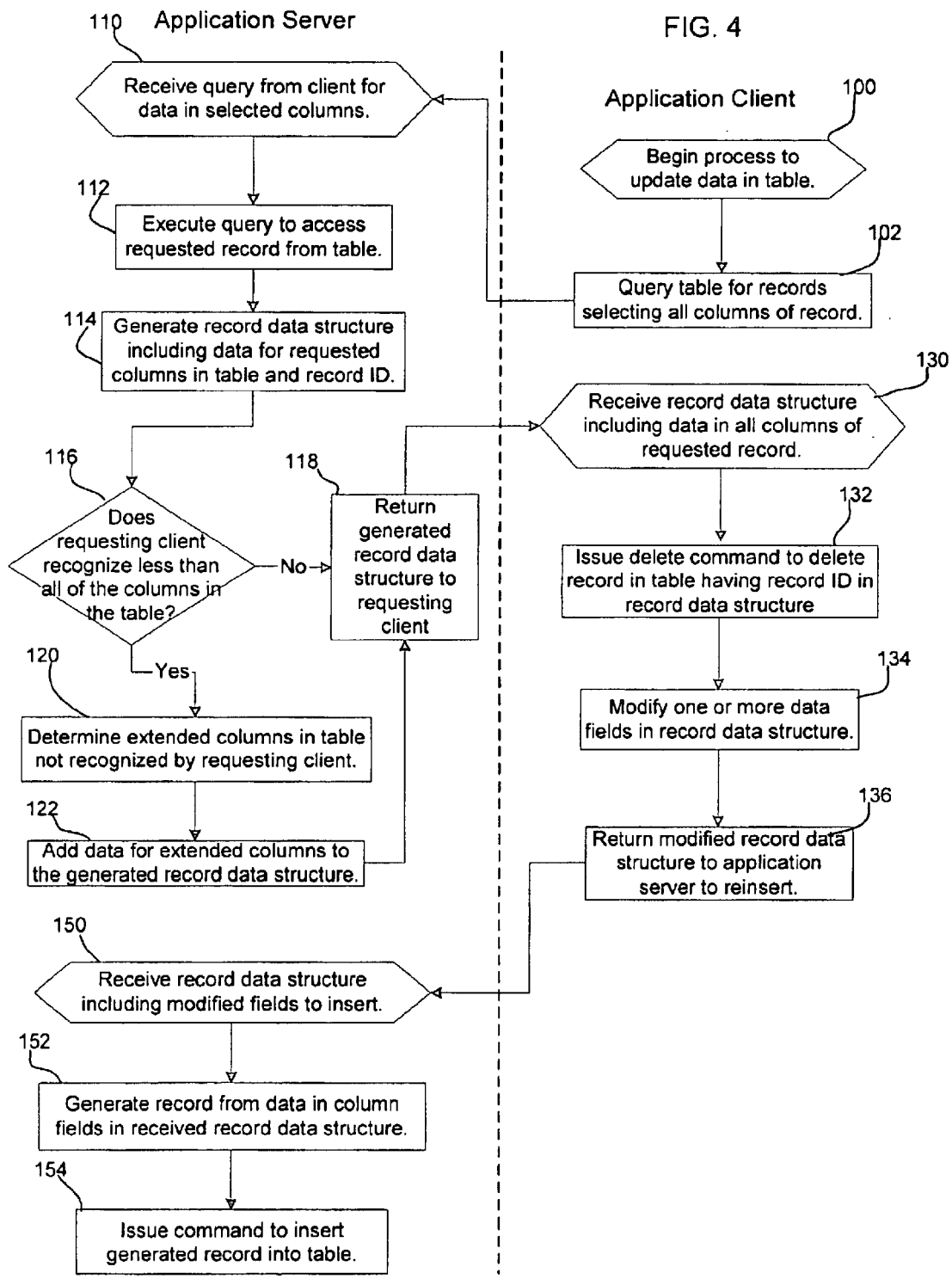
FIG. 4 illustrates logic to update a data record in a database table in accordance with implementations of the invention.

FIG. 4 illustrates logic implemented in the application clients 4a, 4b . . . 4n and application server 6 (FIG. 1) to process a request from an application client 4a, 4b . . . 4n to update a key column that is used to order the records in the index 16. In certain implementations, the application client 4a, 4b . . . 4n will update a key column of an index 16 for one table 14 by first fetching the record to update, deleting the record from the database table 14, updating the record, and then reinserting the record in the table 14 to cause an index record to be generated and inserted into the index 16 according to the key column(s) in the generated index record and the ordering defined for the key column(s) of the index 16. In one implementation, control begins at block 100 in the application client 4a, 4b . . . 4n to update data in the table by performing a fetch/delete/reinsert combination of steps. The application client 4a, 4b . . . 4n queries (at block 102) the table 14 for records and selects all of the columns of the requested records. If the application client 4a, 4b . . . 4n was the initial version 50 and the table 14 was the subsequent version 62 including all seven columns (C1–C7), then the initial version application client 50 would only select the first five columns (C1–C5) because the initial version of the application client 50 does not view extended columns (C6, C7) in the subsequent version 62 of the table 62. However, if the querying application client 4a, 4b . . . 4n is the subsequent version 60, then the application 4a, 4b . . . 4n would select all of the columns (C1–C7) in the subsequent version 62 of the table 62.

At block 110, the application server 6 receives a request from the application client 2a, b . . . n for data in the selected columns. In response, the application server 6 executes (at block 112) the query to access the requested record. A record data structure 70 (FIG. 3) is then generated (at block 114) for each of the requested columns including data in the column fields 74a, 74b . . . 74n and the record ID 72. The application server 6 determines (at block 116) whether the application client 4a, 4b . . . 4n requested all the columns from the table. This determination may be made by accessing information on the client version 50 or 60 provided when the session with the client was initiated. Client version information may indicate whether the particular client version recognizes less table columns than the current application version of the application server 6. Additionally, when establishing the session, the client application 4a, 4b . . . 4n may communicate the table 14 columns the application 4a, 4b . . . 4n recognizes. The application server 6 can then determine whether the number of client recognized table columns is less than the actual number of columns in the table 14. If (at block 116), the requesting client application 4a, 4b . . . 4n recognizes the same number of columns as currently implemented in the table 14, then the application server 6 returns (at block 118) the generated record data structure 70 (FIG. 3) to the requesting client application 4a, 4b . . . 4n.

If (at block 116), the application client 4a, 4b . . . 4n is a lower version than the current version implemented by the application server 6 such that the application client 4a, 4b . . . 4n recognizes fewer than all of the columns currently implemented in the table 14, then the application server 6 determines (at block 118) the extended columns (C6, C7) in the table 62 not recognized by the application client 4a, 4b . . . 4n. This determination may be made by subtracting the number of columns recognized by the requesting application client 4a, 4b . . . 4n from the columns recognized by the application server 6, such that the difference indicates the number of extended columns in the subsequent version of the table 62 not recognized by the initial client application version (V.1) 50. The application server 6 then adds (at block 122) data for the extended columns to further column fields 74a, 74b . . . 74n in the generated record data structure 70 and returns (at block 118) the generated record data structure 70 to the requesting application client 4a, 4b . . . 4n.

Upon receiving (at block 130) the record data structure 70, the application client 4a, 4b . . . 4n then issues (at block 132) a delete data command to the application server 6 to delete the table record having the record ID 72 in the received record data structure 70 and then issues a command to modify (at block 134) data in one or more of the column fields 74a, 4b . . . 4n of the record data structure 70. The application server 6 would perform the operations specified by the issued command. To reinsert the modified record, the application client 4a, 4b . . . 4n returns (at block 136) the modified record data structure 70 to the application server 6 to reinsert into the table 62. Upon receiving (at block 150) the modified record data structure 70 with an insert command, the application server 6 generates (at block 152) a record to insert into the table 62 including the data in all of the column fields 74a, 4b . . . 4n (FIG. 3) and inserts (at block 154) the record into the table 62.

In the event that the requesting client 4a, 4b . . . 4n was operating at a version level that did not view the extended columns (C6, C7), then the data for the extended columns in the record the application client 4a, 4b . . . 4n modified is provided from the record data structure 70 transferred between the application client 4a, 4b . . . 4n and server 6, which is updated and resubmitted to reinsert the record into the table 62. In this way, the reinsert operation initializes the extended data columns to their value before the record was fetched and deleted by stashing the extended data columns (C6, C7) in the record data structure 70, where they are unavailable to the down level version (V.1) of the application client 50. This allows the application client 4a, 4b . . . 4n operating at the initial version level 50 to update records in a subsequent version table 62 by performing a fetch/delete/reinsert without clearing the data in the extended table columns (C6, C7) that the initial version (V.1) application client 50 does not recognize. In the described implementations, the extended table columns (C6, C7) are returned to the application client 4a, 4b . . . 4n operating at the initial version level in a manner that is opaque to the client, such that the lower version application client 4a, 4b . . . 4n is not aware that the extended columns (C6, C7) exist in the record data structure 70. In this way, the data in the extended table columns remains unchanged in the reinserted record and available for use by the subsequent version (V.2) application clients 60 that recognize and use the extended table columns (C6, C7).

In one implementation, the client/server application may comprise a client/server backup and archive program, such as the IBM Tivoli Storage Manager**.

**Microsoft is a registered trademarks of Microsoft Corporation; DB2 and Tivoli are registered trademarks of IBM; and Oracle8 is a trademark of Oracle Corporation.

In such implementations, the application client 4a, 4b . . . 4n interfaces with the application server to backup data objects at the client system 2a, 2b . . . 2n to the application server 6, which in turn may maintain data in various archive and backup storage devices. The application server 6 maintains databases 12 providing information about data objects archived by the application server 6, inventory resources, such as available storage resources, network resources, and information on the configuration of network resources accessible to the application server 6. Those skilled in the art will recognize that the described implementations for updating records in a database through a fetch/delete/insert combination can apply to any client/server application.

ADDITIONAL IMPLEMENTATION DETAILS

The above described implementations for updating data objects in a database may be implemented using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the technique of providing the extended columns to the application at a lower level was applied when updating a key column. However, the described implementation for updating data can apply whenever a database record is deleted and re-inserted, including non-key column data.

In the described implementations, an application server returned a fetched data structure including information on the requested columns to an application client. In alternative implementations, the database related operations described as performed by the application server may be performed by a database engine and the operations described as performed by the application client may be performed by a database application or any other application interfacing with a database to update records by reinserting the records into the database.

In the implementation of FIG. 1, the application client, application server, and database are on separate machines. Alternatively, the client, application server, and database can be implemented on the same machine.

In the described implementations, the application client initiated actions, such as fetch, delete, and reinsert to update data in a record that are indexed by a key column of the record. In alternative implementations, certain of these operations may be performed by an application client when updating index key columns for an application client that does not recognize all the columns in the table. For instance, the application client may submit an API command to update at least one table column that is also an index key column. In response to this API, the application server would return the record data structure and delete both the table record and corresponding index record whose data was included in the record data structure. In response to receiving a returned data structure, the application server would then automatically generate a table and index records to include the data from the data structure, including data from the extended columns (C6, C7) not recognized by the application client, and insert the table and index records in the table and index, respectively.

The above described implementations set forth a technique to provide an application, operating at a lower version level, data from a table record including extended columns not recognized by the application, such that the application server will return less than all the columns to reinsert into the table. In alternative implementations, the data structure may be returned to update a table record without deleting the data in the record data structure. Moreover, the data structure including the extended columns may be returned to the application operating at the lower version for purposes other than updating data.

The described logic of FIG. 4 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computerized method for updating data in a database table in response to requests from a requesting application comprising one of a first application at a first version level and a second application at a second version level, wherein the first application recognizes the table as including a subset of columns in the table that is less than all the columns in the table and wherein the second application recognizes the table as including all the columns in the table, comprising:

receiving a request from the requesting application for specified columns from one record in the table;

accessing the requested record;

generating a data structure including data from the specified columns in the requested record;

determining whether the requesting application is capable of recognizing all the columns in the table;

adding to the data structure data from each column in the table that is not one of the subset of columns if the requesting application is determined to not recognize all the columns in the table; and returning the data structure to the requesting application.

2. The method of claim 1, wherein the second version level of the application includes additional functionality over the first version level.

3. The method of claim 1, further comprising:

receiving from the requesting application a request to delete the accessed record after returning the data structure to the requesting application; and deleting the accessed record from the table.

4. The method of claim 3, wherein generating the data structure further comprises adding a record identifier identifying the accessed record in the table to the data structure, wherein the received request to delete from the requesting application requests to delete the record having the record identifier included in the data structure.

5. The method of claim 3, further comprising:

receiving the data structure returned to the requesting application including data updated by the requesting application;

generating a table record having columns including the data in the received data structure, including the data updated by the requesting application; and inserting the generated table record into the table.

6. The method of claim 5, further comprising:

after deleting the table record, deleting an index record in an index on the table corresponding to the deleted table record; and adding one index record to the index for the inserted table record, wherein the data updated by the requesting application comprises at least one index key column used to sort the index records in the index.

7. The method of claim 1, wherein the request from the requesting application comprises a request to update at least one column in the table that is a key column in one index record corresponding to the requested record in an index on the table, further comprising:

deleting the accessed record from the table and the index record corresponding to the accessed record; and receiving the data structure returned to the requesting application including data modified by the requesting application in at least one column in the table that is one key column in the index.

8. The method of claim 7, further comprising:

generating one table record having columns including the data in the received data structure, including the data updated by the requesting application;

inserting the generated table record into the table after deleting the table record and index record; and generating and inserting one index record into the index for the inserted table record, wherein the data updated by the requesting application comprises at least one index key column used to sort the index records in the index.

9. The method of claim 1, wherein the request for specified columns from one record comprises a database query.

10. A computerized method for updating data in a database table by a first application at a first version level, wherein the first application recognizes the table as including a subset of columns in the table that is less than all the columns in the table, wherein a second application at a second version level recognizes the table as including all the columns in the table, wherein the first application performs:

transmitting a request for specified columns from one record in the table to an application server managing access to the database table;

in response to the request, receiving from the application server a data structure including data from the specified columns in the requested record and data from each column in the table that is not one of the subset of columns recognized by the first application.

11. The method of claim 10, wherein the second version level of the application includes additional functionality over the first version level.

12. The method of claim 10, further comprising:

transmitting to the application server a request to delete the requested record from the table.

13. The method of claim 12, further comprising:

updating in the received data structure one of the subset of columns; and returning the updated data structure to the application server to cause the application server to generate a table record having columns including the data in the updated data structure and insert the generated table record into the table.

14. The method of claim 13, wherein the request to delete further causes the application server to delete an index record in an index on the table corresponding to the deleted table record, wherein returning the updated data structure to the application server further causes the application server to add one index record to the index for the inserted table record, and wherein the data updated by the requesting application comprises at least one index key column used to sort the index records in the index.

15. The method of claim 10, wherein the request comprises a request to update at least one column in the table that is a key column in one index record corresponding to the requested record in an index on the table, wherein the transmitted request further causes the application server to delete the accessed record from the table and delete the index record corresponding to the accessed record, further comprising:

updating, in the received data structure, at least one key column in the index that is also one of the subset of columns; and returning the updated data structure to the application server to cause the application server to generate and insert one table record in the table having columns including the data in the received data structure and generate and insert one index record into the index for the inserted table record.

16. A system for updating data in a database table in response to requests from a requesting application comprising one of a first application at a first version level and a second application at a second version level, wherein the first application recognizes the table as including a subset of columns in the table that is less than all the columns in the table and wherein the second application recognizes the table as including all the columns in the table, comprising:

a computer readable medium including the database table;

means for receiving a request from the requesting application for specified columns from one record in the table;

means for accessing the requested record;

means for generating a data structure including data from the specified columns in the requested record;

means for determining whether the requesting application is capable of recognizing all the columns in the table;

means for adding to the data structure data from each column in the table that is not one of the subset of columns if the requesting application is determined to not recognize all the columns in the table; and means for returning the data structure to the requesting application.

17. The system of claim 16, wherein the second version level of the application includes additional functionality over the first version level.

18. The system of claim 16, further comprising:

means for receiving from the requesting application a request to delete the accessed record after returning the data structure to the requesting application; and means for deleting the accessed record from the table.

19. The system of claim 18, further comprising:

means for receiving the data structure returned to the requesting application including data updated by the requesting application;

means for generating a table record in the database having columns including the data in the received data structure, including the data updated by the requesting application; and means for inserting the generated table record into the table.

20. The system of claim 16, wherein the request from the requesting application comprises a request to update at least one column in the table that is a key column in one index record corresponding to the requested record in an index on the table in the database, further comprising:

means for deleting the accessed record from the table and the index record corresponding to the accessed record; and means for receiving the data structure returned to the requesting application including data modified by the requesting application in at least one column in the table that is one key column in the index.

21. A system for updating data in a database table, comprising:
- a first computer system;
- a first application implemented in the first computer system at a first version level, wherein the first application recognizes the table as including a subset of columns in the table that is less than all the columns in the table, wherein the first application includes logic executed by the first computer system to perform:
  - (I) transmitting a request for specified columns from one record in the table to an application server managing access to the database table; and
  - (ii) receiving, in response to the request, from the application server a data structure including data from the specified columns in the requested record and data from each column in the table that is not one of the subset of columns recognized by the first application.
- a second computer system; and
- a second application implemented in the second computer system at a second version level that recognizes the table as including all the columns in the table.

22. The system of claim 21, wherein the first application further includes logic to transmit to the application server a request to delete the requested record from the table.

23. The system of claim 22, wherein the first application further includes logic to cause the first computer system to perform:
- updating in the received data structure one of the subset of columns; and
- returning the updated data structure to the application server to cause the application server to generate a table record having columns including the data in the updated data structure and insert the generated table record into the table.

24. An article of manufacture including code for updating data in a database table in response to requests from a requesting application comprising one of a first application at a first version level and a second application at a second version level, wherein the first application recognizes the table as including a subset of columns in the table that is less than all the columns in the table and wherein the second application recognizes the table as including all the columns in the table, wherein the code is capable of causing operations comprising:
- receiving a request from the requesting application for specified columns from one record in the table;
- accessing the requested record;
- generating a data structure including data from the specified columns in the requested record;
- determining whether the requesting application is capable of recognizing all the columns in the table;
- adding to the data structure data from each column in the table that is not one of the subset of columns if the requesting application is determined to not recognize all the columns in the table; and
- returning the data structure to the requesting application.

25. The article of manufacture of claim 24, wherein the second version level of the application includes additional functionality over the first version level.

26. The article of manufacture of claim 24, further comprising:
- receiving from the requesting application a request to delete the accessed record after returning the data structure to the requesting application; and
- deleting the accessed record from the table.

27. The article of manufacture of claim 26, further comprising:
- receiving the data structure returned to the requesting application including data updated by the requesting application;
- generating a table record having columns including the data in the received data structure, including the data updated by the requesting application; and
- inserting the generated table record into the table.

28. The article of manufacture of claim 24, wherein the request from the requesting application comprises a request to update at least one column in the table that is a key column in one index record corresponding to the requested record in an index on the table, further comprising:
- deleting the accessed record from the table and the index record corresponding to the accessed record; and
- receiving the data structure returned to the requesting application including data modified by the requesting application in at least one column in the table that is one key column in the index.

29. An article of manufacture including code implemented in a first application at a first version level for updating data in a database table, wherein the first application recognizes the table as including a subset of columns in the table that is less than all the columns in the table, wherein a second application at a second version level recognizes the table as including all the columns in the table, wherein the code in the first application causes operations to be performed comprising:
- transmitting a request for specified columns from one record in the table to an application server managing access to the database table;
- in response to the request, receiving from the application server a data structure including data from the specified columns in the requested record and data from each column in the table that is not one of the subset of columns recognized by the first application.

30. The article of manufacture of claim 29, further comprising:
- transmitting to the application server a request to delete the requested record from the table.

31. The article of manufacture of claim 29, further comprising:
- updating in the received data structure one of the subset of columns; and
- returning the updated data structure to the application server to cause the application server to generate a table record having columns including the data in the updated data structure and insert the generated table record into the table.

* * * * *